US012791662B2

(12) United States Patent
Sethuraman

(10) Patent No.: US 12,791,662 B2
(45) Date of Patent: Nov. 10, 2026

(54) METHOD FOR OPERATING A UWB COMMUNICATION UNIT AS A RADAR DEVICE

(71) Applicant: NXP B.V., Eindhoven (NL)

(72) Inventor: Prasanna Kumar Sethuraman, Bangalore (IN)

(73) Assignee: NXP B.V., Eindhoven (NL)

( * ) Notice: Subject to any disclaimer, the term of this patent is extended or adjusted under 35 U.S.C. 154(b) by 291 days.

(21) Appl. No.: 18/458,273

(22) Filed: Aug. 30, 2023

(65) Prior Publication Data

US 2024/0168128 A1 May 23, 2024

(30) Foreign Application Priority Data

Nov. 3, 2022 (EP) .................................... 22205220

(51) Int. Cl.
*G01S 7/41* (2006.01)
*G01S 7/00* (2006.01)
(Continued)

(52) U.S. Cl.
CPC ............... *G01S 7/411* (2013.01); *G01S 7/006* (2013.01); *G01S 7/038* (2013.01); *G01S 7/292* (2013.01);
(Continued)

(58) Field of Classification Search
CPC .......... G01S 7/411; G01S 7/006; G01S 7/038; G01S 7/292; G01S 7/415; G01S 7/2923;
(Continued)

(56) References Cited

U.S. PATENT DOCUMENTS 10,401,479 B2 * 9/2019 Mabrouk ................ G01S 13/52
2015/0369911 A1 12/2015 Mabrouk et al.
(Continued)

FOREIGN PATENT DOCUMENTS

EP 3885786 A1 * 9/2021 ........... A61B 5/1116
EP 3978949 A2 4/2022
(Continued)

OTHER PUBLICATIONS

Mostafa et al, "Applying singular value decomposition for clutter reduction in heartbeat estimation using M-sequence UWB Radar," 2018 19th International Radar Symposium (IRS), Jun. 20-22, 2018, 10 pages.
(Continued)

*Primary Examiner* — Jack W Keith
*Assistant Examiner* — Clayton Paul Ridder

(57) ABSTRACT

A method for operating a UWB communication unit (100), comprising the steps:

a) transmitting a UWB signal and receiving channel-impulse-responses, CIR;
b) removing of data concerning a coupling path between TX and RX and performing a drift compensation of the data concerning the coupling path;
c) detection of target peaks;
d) pruning of peaks in a peak list with target peaks;
e) assigning a confidence value to selected peaks and adapting a confidence value of the selected peaks; and
f) extracting at least one peak concerning a human target (T1, T2) out of the list of peaks which has a specified confidence value after completion of step e).

20 Claims, 16 Drawing Sheets

(51) Int. Cl.

| | |
|---|---|
| ***G01S 7/03*** | (2006.01) |
| ***G01S 7/292*** | (2006.01) |
| ***G01S 13/02*** | (2006.01) |
| ***G01S 13/522*** | (2006.01) |
| ***G01S 13/86*** | (2006.01) |

(52) U.S. Cl.
CPC ........ *G01S 13/0209* (2013.01); *G01S 13/522* (2013.01); *G01S 13/86* (2013.01)

(58) Field of Classification Search
CPC ........ G01S 7/295; G01S 7/41; G01S 13/0209; G01S 13/522; G01S 13/86; G01S 13/582; G01S 13/88; A61B 5/0816; H04B 1/69
See application file for complete search history.

(56) References Cited

U.S. PATENT DOCUMENTS

| | | | | |
|---|---|---|---|---|
| 2020/0319294 | A1 | 10/2020 | Va et al. | |
| 2021/0011147 | A1* | 1/2021 | Va | G01S 7/415 |

FOREIGN PATENT DOCUMENTS

| | | | | | |
|---|---|---|---|---|---|
| EP | 3978949 | A3 | | 6/2022 | |
| JP | 2020020802 | A | * | 2/2020 | H04W 4/80 |

OTHER PUBLICATIONS

Bingbing, Li, "A Principal Component Analysis Approach to Noise Removal for Speech Denoising", 2018 International Conference on Virtual Reality and Intelligent Systems, Aug. 10-11, 2018, 4 pages.
Doglioni et al., "Cost-effective bistatic radar with ultrawide-band radio", 2022 IEEE International Workshop on Metrology for Industry 4.0 & IOT, Jun. 7, 2022, pp. 207-211.
Storrer et al., "Clutter removal for Wi-Fi-based passive bistatic radar", 2020 IEEE 91st Vehicular Technology Conference, May 25, 2020, pp. 1-5.
Moschevikin et al., "Investigations on Passive Channel Impulse Response of Ultra Wide Band Signals For Monitoring and Safety Applications", 2016 3rd International Symposium on Wireless Systems Within the Conferences on Intelligent Data Acquisition and Advanced Computing Systems, Sep. 1, 2016, pp. 1-8.
Khawaja et al, "UWB radar for indoor detection and ranging of moving objects: An experimental study", 2016 International Workshop on Antenna Technology, Feb. 29, 2016, pp. 102-105.

* cited by examiner

METHOD FOR OPERATING A UWB COMMUNICATION UNIT AS A RADAR DEVICE

CROSS-REFERENCE TO RELATED APPLICATIONS

This application claims the priority under 35 U.S.C. § 119 of European Patent application no. 22205220.1, filed on 3 Nov. 2022, the contents of which are incorporated by reference herein.

FIELD OF THE INVENTION

The present disclosure is related to the technical field of Ultra-Wideband (UWB). In particular, the present disclosure is related to a method for operating a UWB communication unit as a radar device, in particular to a method for operating a UWB communication unit as a radar device to detect breathing of multiple human targets.

BACKGROUND OF THE INVENTION

Ultra-wideband is a technology that uses a high signal bandwidth, in particular for transmitting digital data over a wide spectrum of frequency bands with very low power. For example, ultra-wide band technology may use the frequency spectrum of 3.1 to 10.6 GHz and may feature a high-frequency bandwidth of more than 500 MHz and very short pulse signals, resulting in high data rates. The UWB technology enables a high data throughput for communication devices and a high precision for the localization of devices.

OBJECT AND SUMMARY OF THE INVENTION

An objective is to provide an improved method for operating a UWB communication device.

This objective may be met by the subject matter according to the independent claims. Advantageous embodiments are described by dependent claims.

According to a first aspect there is provided a method for operating a UWB communication unit, comprising the steps:

a) transmitting a UWB signal and receiving channel-impulse-responses, CIR;
b) removing of data concerning a coupling path between TX and RX and performing a drift compensation of the data concerning the coupling path;
c) detection of target peaks;
d) pruning of peaks in a peak list with target peaks;
e) assigning a confidence value to selected peaks and adapting a confidence value of the selected peaks; and
f) extracting at least one peak concerning a human target (T1, T2) out of the list of peaks which has a specified confidence value after completion of step e).

In this way by means of the proposed method a breathing direction and breathing signals of human targets can be detected. The proposed method is able to detect a single living target (e.g. person, animal), wherein human targets are identified and can be resolved from ghost reflections from static objects. Advantageously, the proposed method can be implemented on-chip for a usage in a UWB-enabled communication device.

According to a further aspect there is provided a computer implemented method to carry out the proposed method.

According to a further aspect there is provided a UWB communication unit, comprising means to perform the proposed computer implemented method.

According to a further aspect there is provided an electronic device comprising a proposed UWB communication unit.

According to an embodiment, in step b) the removing of the data concerning the coupled path is done in the time domain. In this way, the coupled part with a strong DC component is removed in order to detect real targets.

According to a further embodiment in step b) a deletion of data concerning static targets are removed in the time domain by taking the channel impulse responses, CIR, and by subtracting one reference from the channel impulse responses, CIRs and to compensate the drift. Thus slow changings of the coupled path over time can be considered. In this way, it is still possible to determine a range doppler map. By removing the zero bin, the first CIR is taken as a reference CIR.

According to a further embodiment, every first channel impulse response, CIR, is taken as a reference and is subtracted from every following next defined number of channel impulse responses, CIR. In this way, e.g. a first CIR is subtracted from the following 99 CIRs, or the first CIR is subtracted from the next 10 CIRs, etc. In this way a detection of moving targets is supported, because only changes within a defined number of CIRs are then captured. As a consequence, clutter removal and drift compensation is done in this way.

According to a further embodiment, in step c) the detection of target peaks is done by computing a range doppler map out of clutter removed channel impulse responses, CIR and a mean doppler profile, wherein clutter removed channel impulse responses, CIRs, are averaged within one window. A CIR matrix is formed by taking a window that comprises a certain number of CIRs and placing each CIR measurement in one row. In order to get a mean CIR and a range doppler map a computation of FFT is done across each column. Then a peak search finding can be carried out in the mean Doppler profile and an initial list of targets from this doppler map is created.

According to a further embodiment, in step c) data concerning target peaks in clutter removed CIRs are determined by using an RF filter with specific equalizer coefficients.

According to a further embodiment in step d) the pruning of peaks in the peak list comprises the steps:

- Computing of SNR for each determined peak and drop those peaks with a specified SNR;
- Computing a correlation coefficient between each peak and subsequent peaks and to drop the subsequent peaks, if their correlation coefficient is above a specified threshold. Multiple peaks that are correlated, have a common signature: these peaks are correlated to one single target, wherein the correlation coefficient is computed between all the paths. In this way, only those targets are kept, whose peaks have a low correlation coefficient between each other out of several detected peaks. Other peaks with high correlation coefficients can be declared as ghost targets created by reflections from nearby objects and can therefore be dropped.

According to a further embodiment, in step d) data concerning targets which are changing a place, are removed. A windows based analysis shows only those peaks, that show one particular tap. This peak is likely a stationary human target, which the method is interested to detect. Hence, a confidence value for such a target is increased, this is done on a window per window basis.

According to a further embodiment, a confidence value is assigned to a target, where a peak with a converging specified confidence level is defined as a human target. In this way, a final list of targets is created, with targets with a specified level of confidence (e.g. 90%).

According to a further embodiment, in step e) a locking of human targets is performed, wherein a final list of targets as targets is determined which consistently existed over a defined number of windows. In this way, targets are found which are always present, where those targets are "locked". If at some point of time, anything is moving close to this target, such target is not lost. In this way, a locked target is specified as a target, which is intended to be kept. This forms a basis of targets, for which a breathing rate is intended to be determined.

According to a further embodiment in step f) a breathing pattern of a human target is determined. This represents a use case, where a breathing pattern of a human target can be recorded over a specific time.

According to a further embodiment in a case, that a breathing signal is not consistently detectable, a frequency component is determined, that is closest to the last detected breathing frequency. In this way, a tracking of a breathing of a human target can be carried out even during small motions of the human target.

The aspects defined above and further aspects of the present disclosure are apparent from the examples of embodiment to be described hereinafter which are explained with reference to the examples of embodiment. The disclosure will be described in more detail hereinafter with reference to examples of embodiment but to which the disclosure is not limited.

DESCRIPTION OF EMBODIMENTS

Figure 1:
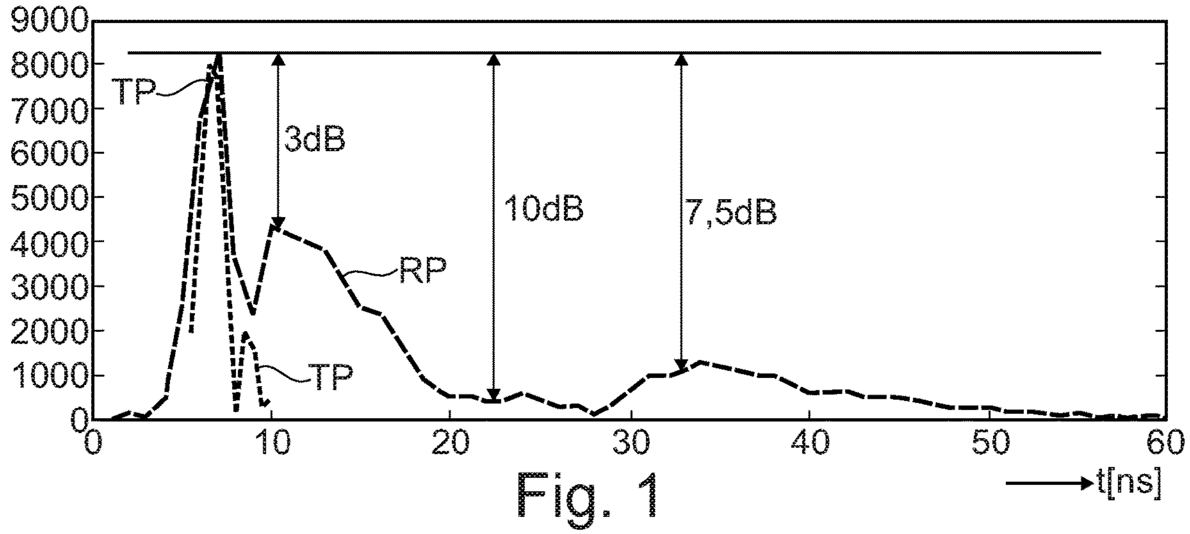
FIG. 1 shows transmitted and received UWB pulses.

The illustrations in the drawings are schematical. It is noted that in different figures, similar or identical elements or features are provided with the same reference signs or with reference signs which are different from the corresponding reference signs only within the first digit. In order to avoid unnecessary repetitions, elements or features which have already been elucidated with respect to a previously described embodiment are not elucidated again at a later position of the description.

Further, spatially relative terms, such as "front" and "back", "above" and "below", "left" and "right", et cetera are used to describe an element's relationship to another element(s) as illustrated in the figures. Thus, the spatially relative terms may apply to orientations in use which differ from the orientation depicted in the figures. Obviously all such spatially relative terms refer to the orientation shown in the figures only for ease of de-scription and are not necessarily limiting as an apparatus according to an embodiment of the invention can assume orientations different than those illustrated in the figures when in use.

Before, referring to the drawings, exemplary embodiments will be described in further detail, some basic considerations will be summarized based on which exemplary embodiments of the invention have been developed. It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

In the context of the present disclosure, amongst others, the following abbreviations are used:

| | |
|---|---|
| $T_{RFRI}$ | RFRI: Radar Frame Rate Interval (2.5 ms-250 ms) |
| $F_s^{chan}$ | Sampling rate of the channel in slow time, $1/T_{RFRI}$ (4 Hz-400 Hz) |
| $L_{win}$ | Number of CIRs in one window equivalent to the FFT size, $N_{FFT}$ used for range doppler map |
| $N_{taps}$ | Number of taps in CIR |
| $N_{acq}$ | Number of windows checked for target lock |
| $N_{drop}$ | Number of windows to be checked before dropping a locked target |
| $N_{bpm}$ | Number of slow time samples used for BPM estimation |
| $h_n(\tau)$ | CIR sample at tap $\tau$ (fast time) and slow time n |
| $\check{h}_n(\tau)$ | Clutter removed CIR sample at tap $\tau$ (fast time) and slow time n |
| $v(k, \tau)$ | Doppler value at doppler bin k and tap $\tau$ |
| $\mathcal{F}\{\ \}$ | Fourier Transform |
| $\mathcal{CR}\{\ \}$ | Clutter removal operation |
| $\tau_p$ | Tap where a peak is found |
| $\tau_{tgt}$ | Tap where a target lock is achieved |
| $\rho(\tau)$ | Confidence metric of a peak being at tap $\tau$ |
| $k_{bpm}$ | Peak location in spectrum that corresponds to breathing frequency |
| $\gamma(k_{bpm})$ | SNR metric at $k_{bpm}$ |

The proposed method can be used to detect human targets and to extract their breathing pattern. The proposed method can use an UWB impulse radio based modem that is based on the IEEE 802.15.4/4z HRP standard, and which is used as a radar device to achieve detection of a human targets and measure the breathing rate and pattern of those targets. Additional applications include human presence detection, proximity detection, fall detection and collision warning, all of these for human targets in indoor environments. The proposed method overcomes some practical challenges, which is outlined in more detail hereinafter.

Since a UWB modem with 500 MHz bandwidth can be used as radar, the pulses that are transmitted have main lobe duration shorter than 2 ns. It can therefore be problematic to turn off the RF part of the receiver only during that 2 ns interval and turn it on immediately. However, when we the receiver is not turned off, since the transmit and receive antennas are co-located on the same device, there can be significant transmit power that couples to the receiver.

FIG. 1 shows effects of pulse spread due to RF (radio frequency). A narrow transmit pulse TP that is transmitted, passes multiple analog filters in both transmitter and the receiver, and as a result of this filtering, the pulse spreads in time. This effect can also be seen on the coupled path which is no longer localized in the CIR to a few "taps" but spreads across multiple taps. This is shown in the measurement plot of FIG. 1, which shows results of a CIR measurement with power ratios between a transmitted pulse TP and a received pulse RP at different times. The mentioned pulse spread can make it difficult to see the signal due to reflection in the CIR.

In addition, the pulse spread is not only affecting the coupled path, but also the reflected signal, and results in difficulties with resolving two nearby reflections. For example, there can be a clear peak due to a target at a defined tap, but if there is a second target at another tap, it is masked by the pulse spread caused due to RF filtering (not shown).

Figure 2:
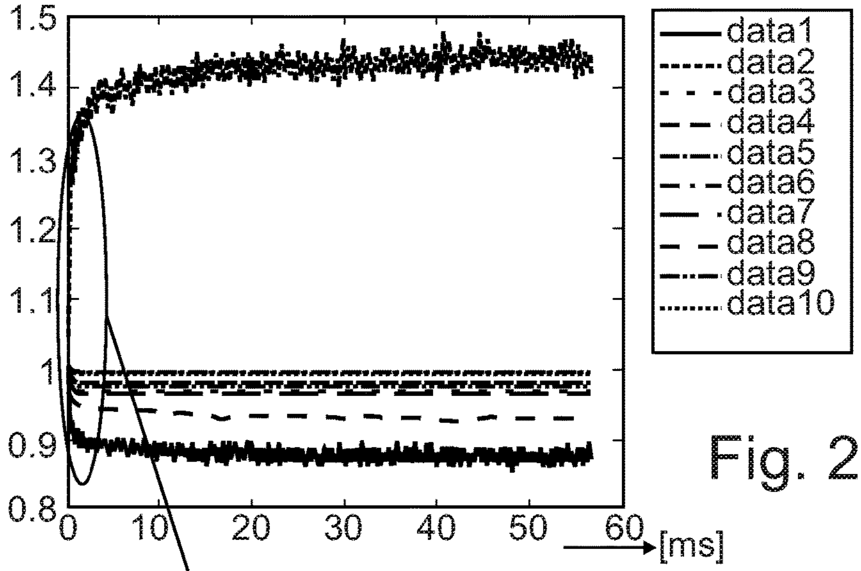
FIG. 2 shows CIR drifts on different taps.
Figure 3:
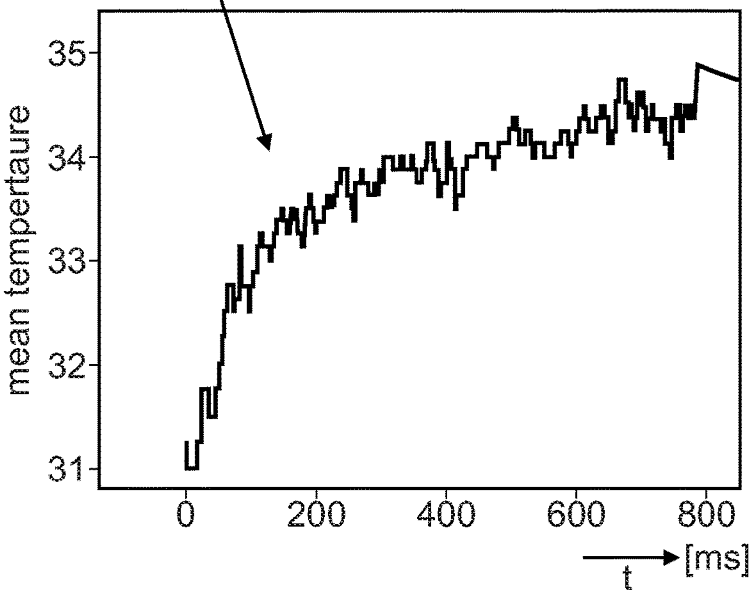
FIG. 3 shows the correlation of CIR drifts of FIG. 2 with chip temperature.

FIGS. 2 and 3 indicate that the coupled path $h_s(\tau)$ also changes (drifts) over time depending on the temperature of the UWB chip and therefore the assumption that it is static is not completely true. We can write it then as $h_s(\tau, t)$ and if $h_s(\tau, t)/h_s(\tau, t=0)$ is plotted, the following plot for different taps r can be seen. Changes in CIR due to this drift can also be stronger than the changes in CIR due to the target movement, and therefore interferes with target detection. FIG. 2 shows a CIR drift on different taps, and FIG. 3 shows the strong correlation of the temperature variation to drift observed in FIG. 2.

In an environment where there are lot of static objects such as e.g. chairs, tables, sofas, walls, cupboards etc., the changes due to movement of a target not only shows up in just the tap corresponding to the location of the target, but also at other tap locations due to the reflections from static objects bouncing off the human target before reaching the receiver of a UWB communication unit (not shown).

The proposed method is able to detect the right human target amongst all those multipath reflections, which means having a way of differentiating the changes due to the target from the changes due to reflections that bounce off the target.

Changes in the environment can be due to human targets walking around or when the human targets are stationary but breathing, which causes movement of the chest and this movement can be detected and the periodicity of this movement estimated as breathing rate. When there is other movements in addition to breathing, the reflections due to the other movements are much stronger than the reflections from breathing and it is then impossible to detect the signal due to breathing movement.

The proposed method is able to differentiate stationary human targets from moving human targets. A moving human target in the context of the present disclosure means a human target which moves from one place to another place. One way of doing that is by looking at the doppler frequencies wherein moving human targets usually generate much higher doppler frequencies compared to the stationary targets. But the signal reflection due to the moving target also spreads across multiple taps and contaminates/interferes with the signal at the tap corresponding to the stationary targets.

The time varying CIR can be modelled by the equation below, wherein $h_s(\tau, t)$ is the coupled path which also drifts over time, and wherein a second term is the signal from different reflections in the environment with corresponding amplitude and doppler variations over time.

$$h(\tau, t) = h_s(\tau, t) + p(t) * \sum_{\ell=1}^{L} \alpha_\ell(t) e^{j2\pi f_d(\ell) t} \delta(t - \tau_\ell)$$

In a first step of the proposed method the coupled path $h_s(\tau, t)$ is removed ("clutter removal") in order to be able to see reflected signals, which are otherwise not detectable due to relatively high magnitude of the coupled path $h_s(\tau, t)$.

The coupled path $h_s(r, t)$ can e.g. be removed in the doppler domain, using the range doppler map. However, this requires high precision FFT (Fast Fourier Transform) to accommodate the dynamic range needed to represent both the coupled path and the relative much weaker target reflections. It can be seen from the range doppler map plots of FIGS. 4, 5 computed on the "raw CIR" which is $h(\tau, t)$, that the coupled path $h_s(\tau, t)$ gets mapped to the DC bin after FFT and can be removed by simply nulling the DC bin as depicted in FIG. 5.

Figure 5:
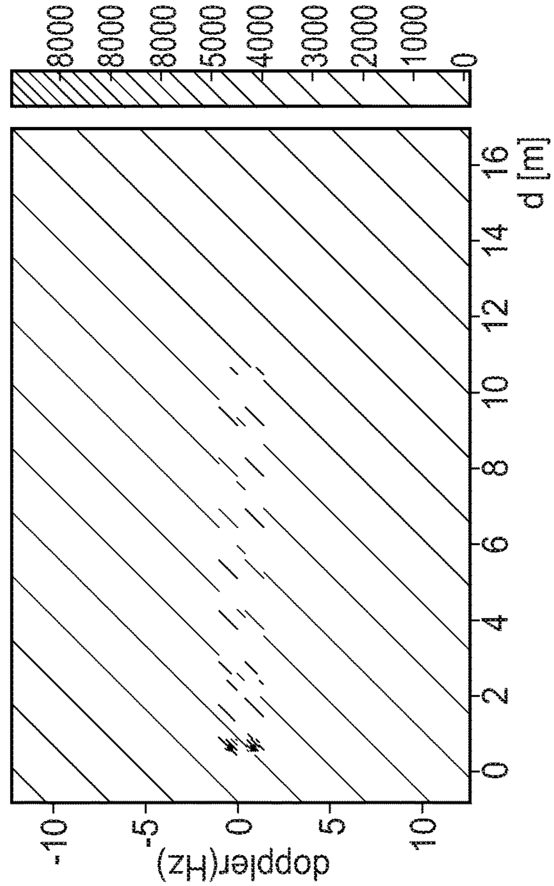
FIG. 5 shows the range doppler map of CIR data after DC bin nulling.
Figure 4:
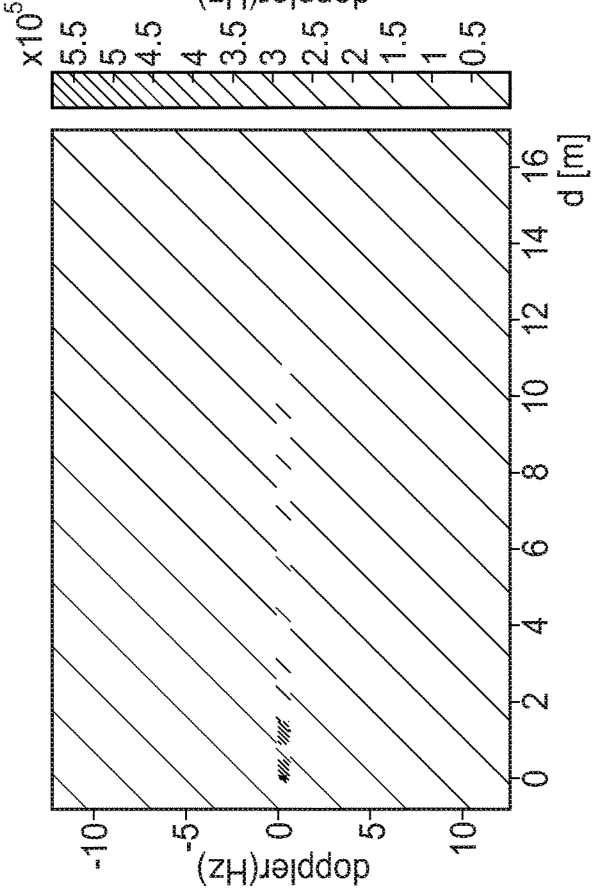
FIG. 4 shows range doppler maps on raw CIR data.

However, the magnitude of the DC bin, as can be seen in FIG. 4 (range doppler map of raw CIRs), is more than ten times larger than the magnitude of the target signal seen in FIG. 5 (range doppler map after DC bin nulling). This is the case for close distance and for farther distances where the target signal is much weaker due to the propagation loss, the coupled path is e.g. 100 to e.g. 1000 times larger than the target signal.

Therefore, the proposed method removes the coupled path $h_s(\tau, t)$ in the delay domain (time domain), by assuming the coupled path to be static. If the measured CIR is taken at one time instance $t_0$ as the reference, the clutter removed CIRs can then be written as follows:

$$h_{ref}(\tau) = h(\tau, t_0)$$

$$\breve{h}(\tau, t) = h(\tau, t) - h_{ref}(\tau)$$

Figure 6:
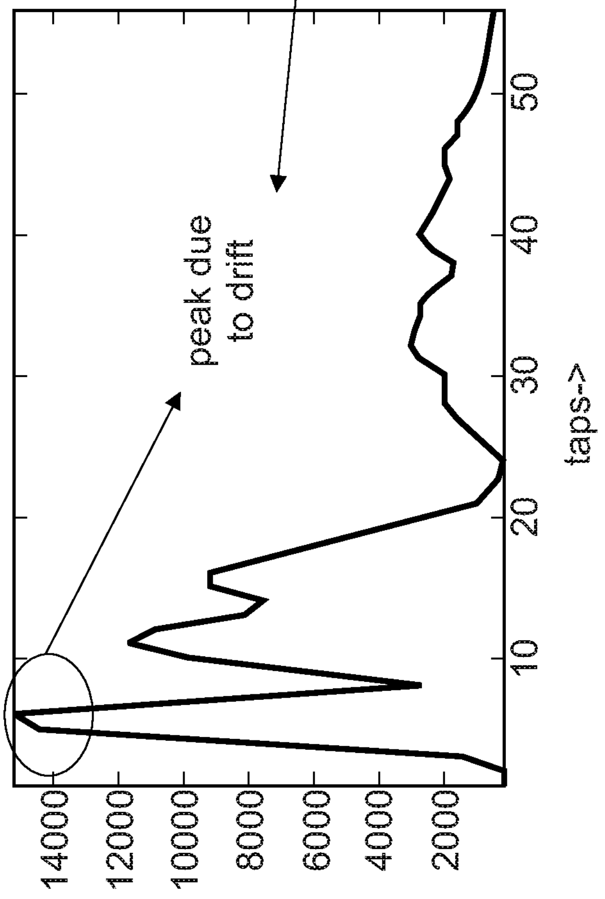
FIG. 6 shows CIR data without clutter removal.
Figure 7:
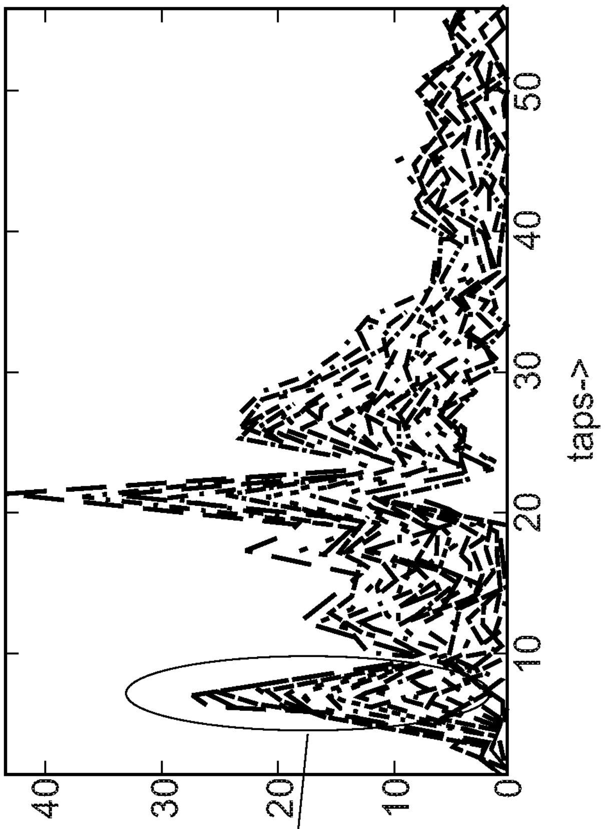
FIG. 7 shows CIR data after clutter removal.

One recognizes that in this way the coupled path $h_s$ is removed which is acceptable as long as $h_s$ does not vary significantly over a time duration of interest for the breathing detection use case. FIG. 6 shows CIR without clutter removal over taps, FIG. 7 shows CIR after clutter removal over taps. One recognizes in FIG. 7 a peak due to drift (highlighted section of FIG. 7), which is at the same tap location as the coupled path peak in FIG. 6. The CIR before clutter removal as shown in FIG. 6 does not convey any information about real human targets and does not show any visible changes due to target movement, since the changes are more than e.g. 20 dB smaller than the coupled path magnitude. After having performed clutter removal, the movements due to target signal can be seen in FIG. 7. It can also be seen in FIG. 7 that another peak (appr. at tap 20) shows up due to the coupled path drifting over time.

It can be seen from measurements that the coupled path $h_s$ drifts slowly over time, and given long enough time, the drift accumulates and changes the coupled path significantly and this change would then be again stronger than the changes due to target movement. One way to compensate for the drift is to model the drift and to remove the drift from the measured CIR.

However, since one window (a set of CIRs) is processed at a time to compute the range doppler map, the window will have $N_{FFT}$ CIRs, this long term drift can be avoided by periodically updating the reference CIR $h_{ref}(\tau)$. The reference CIR can then be expressed as:

$$h_{ref}(\tau, m) = h(\tau, t_0 + mT_{upd}), m = 0, 1, 2, \ldots$$

The period of update $T_{upd}$ can either be every doppler processing window which is $N_{FFT}T_{RFRI}$, or can independently be chosen depending on the rate of drift and the nature of environment (relatively static or lots of movement, etc.) the UWB radar operates in.

Figure 8:
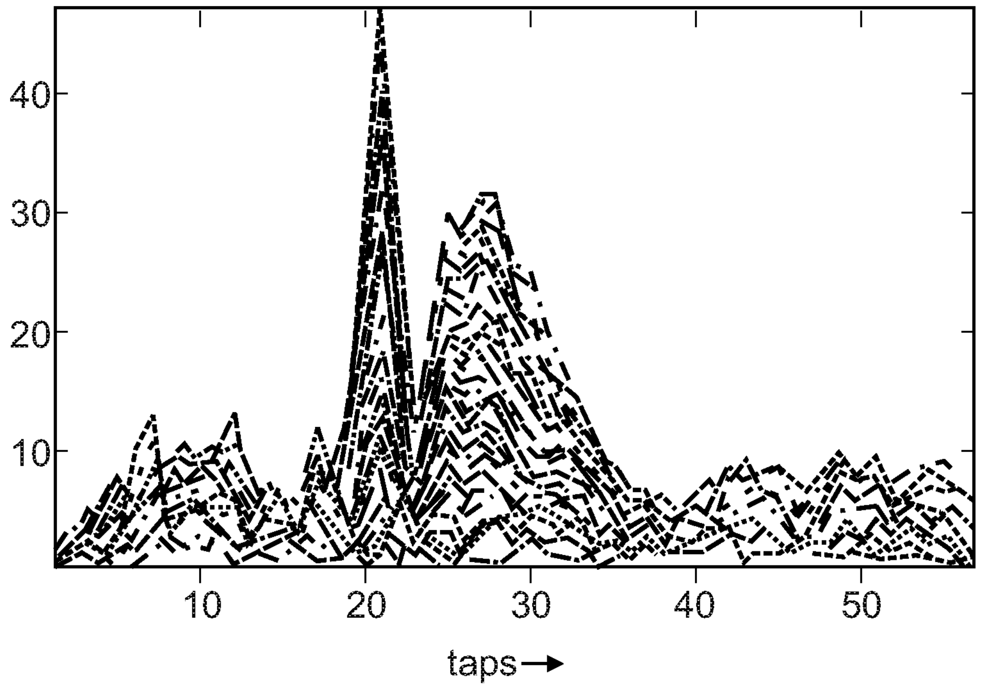
FIG. 8 shows clutter removed CIRs with periodic update of reference CIR.

FIG. 8 (CIR after clutter removal) shows how a periodic update of the reference removes the highlighted peak of FIG. 7 due to drift in the clutter removed CIRs. There are no downsides to this periodic update since the proposed method is only interested in a detection of moving human targets.

Static object detection is not possible due to the non-deterministic coupled path which changes from device to device and based on TX and RX analog gains. To get to static object detection, a switch to a low PRF radar mode is done, where there is sufficient gap between pulses so that the RF has enough time to turn on after being turned off during the transmit pulse duration. But this also introduces a blind spot where the receiver cannot detect target reflections during the time it is turned off. With the pulse spread due to RF filters, the duration for which we need to keep RF turned off is also larger, thereby limiting the usability of this mode for close distance static object detection. In the context of the present disclosure, it is focused only on doppler radar where changes due to target movement in the environment are detected.

Figure 9:
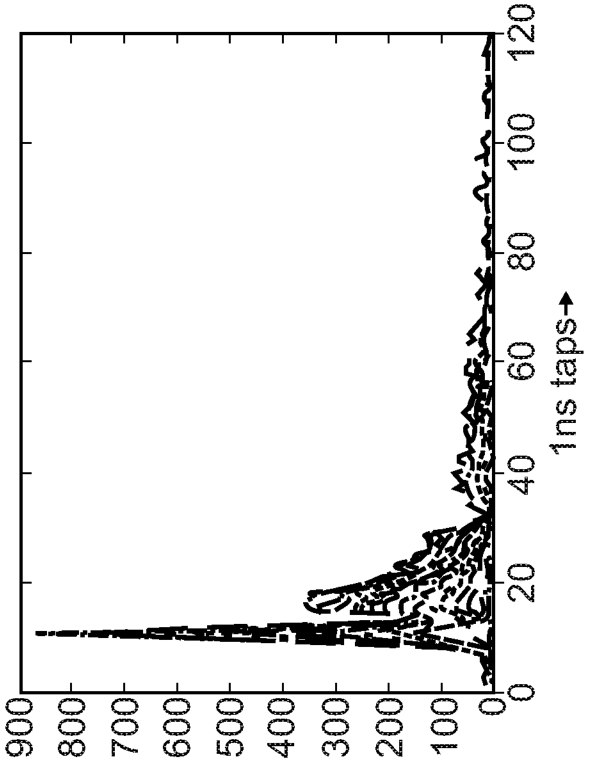
FIG. 9 shows clutter removed CIRs over a three second window.
Figure 10:
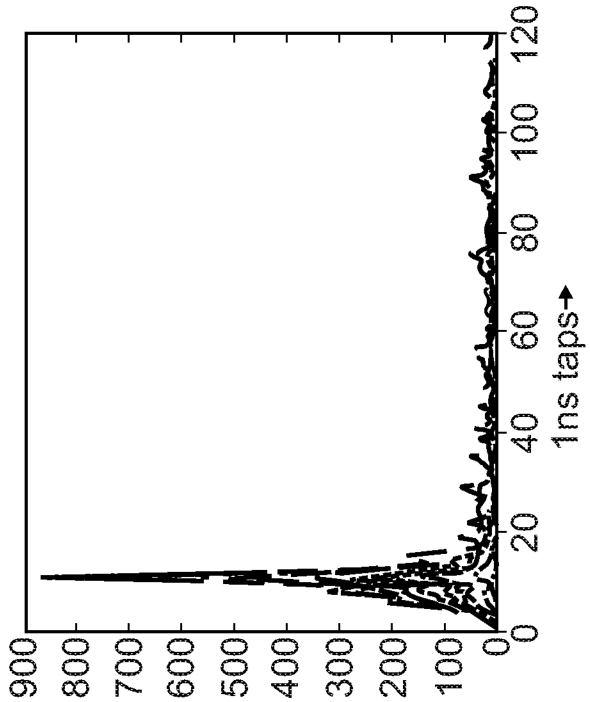
FIG. 10 shows a filtered and clutter removed CIRs over a three second window.
Figure 11:
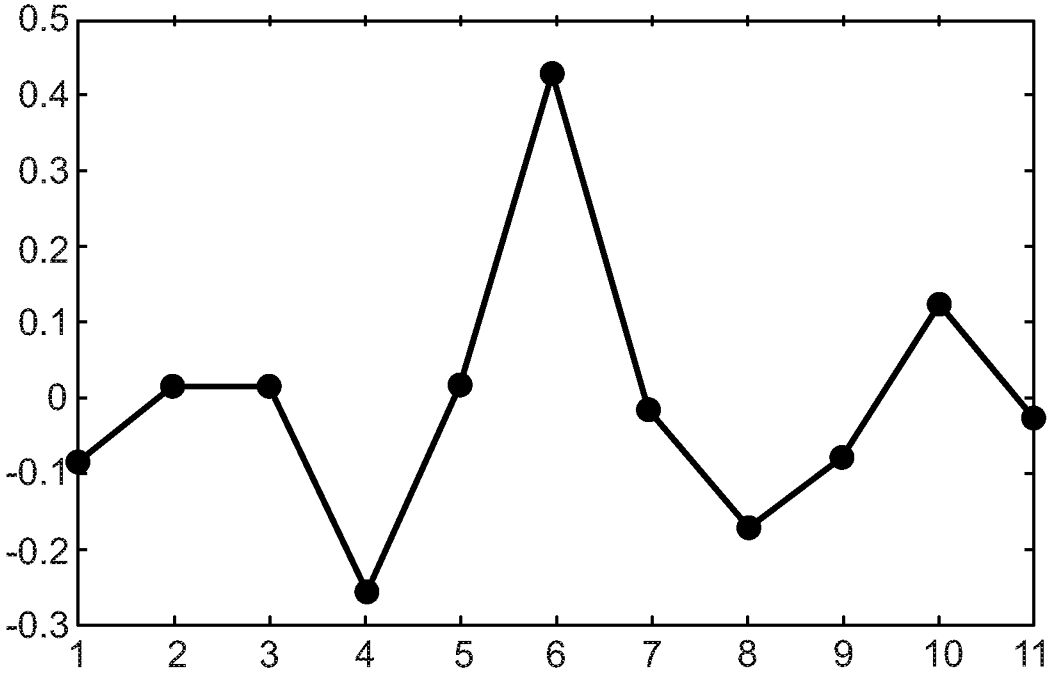
FIG. 11 shows optimized filter coefficients for equalization.

Since the RF filters spread the pulse across several taps, a filter is designed to reverse the impact of RF filters, to "sharpen" the target peak seen in the clutter removed CIR. FIGS. 9 and 10 show the improvement that can be achieved with an equalizer, wherein FIG. 9 shows clutter removed CIRs over an exemplary three second window and FIG. 10 shows filtered and clutter removed CIRs over an exemplary three second window. In particular, it can be seen in FIG. 10, that the peak of FIG. 9 at tap 20 is eliminated by means of an equalizer with specific filter coefficients. FIG. 11 shows optimized filter coefficients for the equalizer, which are found using the CIR measurement from the device and solving a constrained minimization problem where the energy in main lobe of the pulse is maximized while the energy outside the main lobe is minimized.

After the clutter removal as explained above has been completed, a finding of target peaks is performed. This peak search can be limited to one dimension by computing a mean CIR profile $\check{h}_{mean}(\tau)$ by averaging the magnitude of all clutter removed CIRs within a window, or a mean doppler profile $v_{mean}(\tau)$ where the range doppler map over the doppler dimension is averaged. Mathematically, these operations can be written as follows:

$$\check{h}_{mean}(\tau) = \frac{1}{N_{FFT}}\sum_m |h(\tau, mT_{RFRI})|$$

$$v_{mean}(\tau) = \frac{1}{N_{FFT}}\sum_k |v(\tau, k)|$$

It can be beneficial to use the mean doppler profile since the doppler profile can be limited to the frequencies of interest by simply selecting only those frequency bins for averaging. But generating a target list based on the mean CIR profile can also be helpful to reduce the computational complexity. First, the list of interested taps can be determined from the mean CIR profile, and then FFT is only computed for those interested taps to get the range doppler map rather than computing FFT for all taps. This approach is elaborated in the present disclosure where ways to implement the proposed method inside an electronic chip are explained, either in DSP-firmware, or hardware.

Once a one dimensional CIR or doppler profile is determined, peak finding algorithms to get a list of target peaks can be performed. To this end, either linear peak search or use algorithms with adaptive thresholding, such as CFAR (Constant False Alarm Rate) can be performed.

In the proposed method, the linear peak search with several control parameters is performed to decide which peaks are declared as true peaks and which peaks can be ignored. These control parameters include the height of the peak (prominence) and the distance from previous peak (separation). If the input to peak detection is denoted as $\gamma(\tau)$, the following steps describe the peak detection algorithm. The notation $\Leftrightarrow$ in the following algorithm refers to "if and only if".

Find Left Minima:

$$\{\gamma_{min}^-, \tau_{min}^-\} = \gamma(\tau) : \gamma(\tau-1) > \gamma(\tau) < \gamma(\tau+1), \tau \in [1, \tau_{min}^-]$$

Find Subsequent Maxima:

$$\{\gamma_{max}, \tau_{max}\} = \gamma(\tau) : \gamma(\tau-1) < \gamma(\tau) > \gamma(\tau+1), \tau \in [\tau_{min}^-, \tau_{max}]$$

Loop Until $\tau<\tau_{end}$

Find Right Minima:

$$\{\gamma_{min}^+, \tau_{min}^+\} = \gamma(\tau) : \gamma(\tau-1) > \gamma(\tau) < \gamma(\tau+1), \tau \in [\tau_{max}, \tau_{min}^+]$$

Check if current maxima is a desired maxima (peak prominence and distance from previous maxima). If yes, add it to the list of peaks:

$$\gamma_{prom} = (\gamma_{max} - \max\{\gamma_{min}^-, \gamma_{min}^+\})$$

$$\Delta\tau_p = \tau_{max} - \tau_p(\ell - 1)$$

$$\tau_p(\ell) = \tau_{max} \Leftrightarrow \gamma_{prom} < \Gamma_{prom}^{min}, \Delta\tau_p > d_{peak}^{min}$$

Left Minima=Right Minima $$\{\gamma^-_{min}, \tau^-_{min}\} = \{\gamma^+_{min}, \tau^+_{min}\}$$

Find Next Maxima $$\{\gamma_{max}, \tau_{max}\} = \gamma(\tau) : \gamma(\tau-1) < \gamma(\tau) > \gamma(\tau+1), \tau \in [\tau^-_{min}, \tau_{max}]$$

Figure 12:
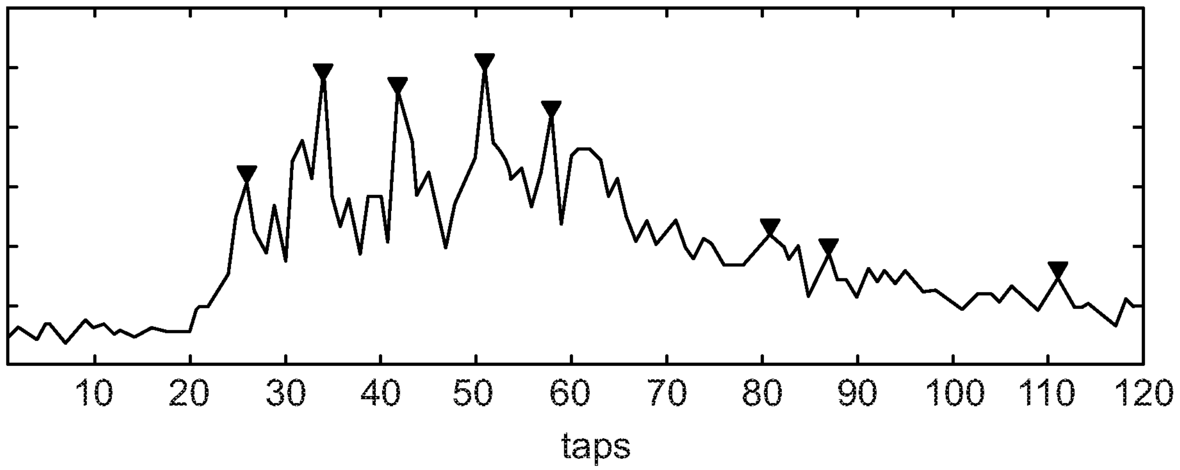
FIG. 12 shows an example result from a peak detection algorithm.

An example result of the above mentioned peak detection algorithm is shown in FIG. 12, which shows eight maxima. Those eight maxima represent peaks which have been determined by means of the above mentioned peak CFAR finding algorithm. Once a list of peaks in the mean CIR or mean doppler profile from the peak finding algorithm has been determined, some of the peaks can be removed from the list based on metrics we can compute for those peaks.

Figure 13:
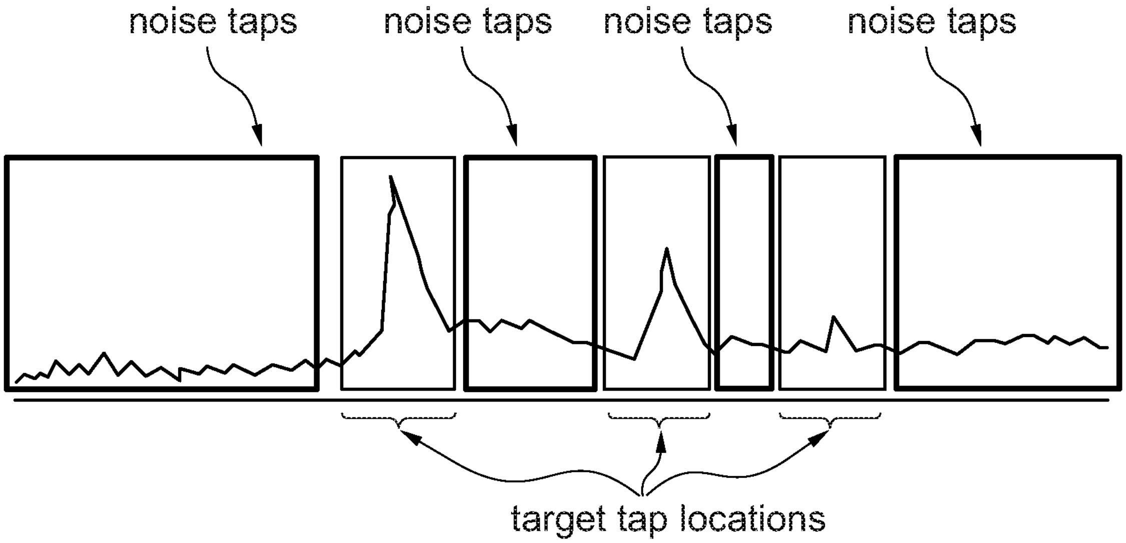
FIG. 13 shows peak detection using SNR computation.

A first metric in order to prune the target list is to compute the SNR for each of those peaks. The noise power is computed on all taps that are not in the neighborhood of the taps where a peak is found, as shown in FIG. 13 which indicates a distinction between noise taps (not interesting peaks) and target tap locations (interesting peaks).

A second metric, used in the proposed method, is to compute a correlation coefficient between each peak and all the subsequent peaks. If the correlation coefficient is close to 1, this means that the signal at these tap locations are highly correlated and therefore likely coming from nearby reflections bouncing off the same human target that is responsible for the current peak.

For two vectors x and y, the correlation coefficient can be computed as:

$$\rho = \frac{\sum_i (x_i - \overline{x})(y_i - \overline{y})}{\sqrt{|x|^2|y|^2}}$$

If N peaks are found at locations $\tau_i$ such that $\tau_i < \tau_{i+1}$ (meaning the peaks are ordered as per the location), then for the ith peak, the correlation coefficient between vectors $h(\tau_i, t)$ and $h(\tau_j, t)$ were $j > i$ and $\tau_i$, $\tau_j$ are the list of peak locations which are computed. Afterwards all peaks at $\tau_j$ for those values of j are determined where the correlation coefficient with $\rho(i,j)$ is close to 1.

In the further course, proposed method moves from the ith peak to the next available peak in the list, wherein this process is repeated. This step can be summarized in the following way:

for peaks at $\tau_{p_i}$ and $\tau_{p_j}$, compute the correlation coefficient and keep only $$\min\{\tau_{p_i}, \tau_{p_j}\} \text{ if } r(i, j) > r^{corr}_{th}$$

$$\rho(i, j) = \left|\sum_n h_n(\tau_{p_i}) h^*_n(\tau_{p_j})\right| \Big/ \sqrt{\sum_n |h_n(\tau_{p_i})|^2 \sum_n |h_n(\tau_{p_j})|^2}$$

The proposed method implements an adaptive way of building a confidence metric on the list of peaks to separate stationary targets from other movements in the environment. It is operated here based on the fact that if there are stationary targets, then the peak location corresponding to those targets will most likely not change over multiple windows. The proposed method uses this fact to increase or decrease the confidence value which is available on each peak location depending on a finding of a peak in that location in the current window. This procedure can be described as follows:

For Every Window:

Reinforce confidence on the identified peaks $\tau_p$ and reduce confidence on missed peaks $\tau_m = \{\tau_p\}^c$, the notation { } refers to a set of values and $\{\ \}^c$ refers to the complement of the set. This effectively picks out all stable peaks that persist over multiple windows, and those are the peaks which the method wants for estimating stationary targets $$\rho(\tau_p) = \min\{1, \rho(\tau_p) + \rho_\uparrow\}$$

$$\rho(\tau_m) = \max\{0, \rho(\tau_m) - \rho_\downarrow\}$$

The proposed method then performs a peak search on the confidence metric $\rho(\tau)$, sorts the peaks based on their magnitude and picks the first M peaks, if M is a maximum number of targets, which are intended to be detected.

Since real environments are often changing, it is possible that stationary targets that were identified consistently in the previous windows do not show up in a few windows due to excessive movements in the environment, contaminating the taps where stationary peaks are present. Rather than immediately reducing the confidence of those tap locations, the proposed method follows the strategy of target lock acquisition that is common in "acquire and track" radar systems. If a peak (based on confidence metric) at a specific location is seen for last $N_{acq}$ windows, then a lock is declared for that peak location.

On the other hand, if a locked target is not seen in the selected peaks, a "forget timer" is started and the target lock on that peak is removed once the forget timer reaches $N_{drop}$. In this way, the method converges to a point, where a peak has a good confidence as to be regarded as a "real target" in form of a human person. In this way, a final list of human targets is determined, where a breathing rate is to be determined at the human targets of the final list.

Figure 14:
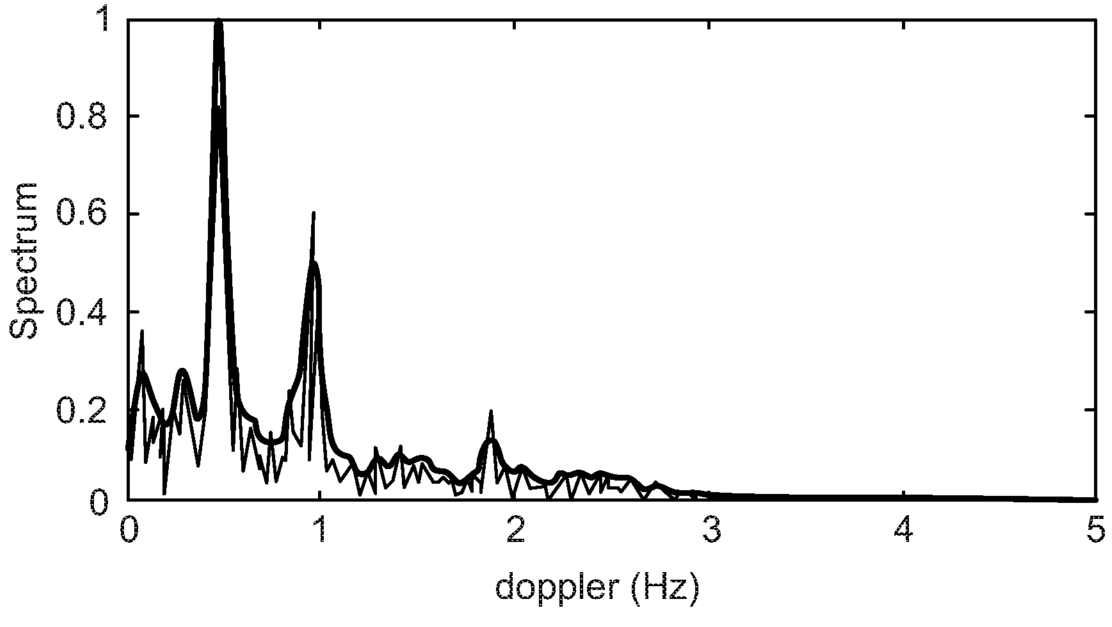
FIG. 14 shows a spectrum during clean breathing of a human target.

Once the target location is known, the CIR tap value across slow time are collected and a corresponding spectrum is computed via FFT. If there is clean breathing of a human person, then the breathing frequency can be easily extracted from the spectrum. This is shown in FIG. 14, which shows a spectral content for clean breathing of a human person, depicted as a spectrum over doppler frequency. The figure shows a very strong peak at appr. 0.5 Hz, which corresponds to a breathing frequency of a human target. A number of samples across slow time which are collected at that particular tap depends on the RFRI. There is needed at least a ten second window in order to have enough breathing cycles for the computation of the spectrum. To support effectively that one constant FFT size is used, the vector is resampled to 10 Hz sampling rate. In order to get a resolution of one breath per minute, a computation of a 1024 point FFT is favorable.

Figure 15:
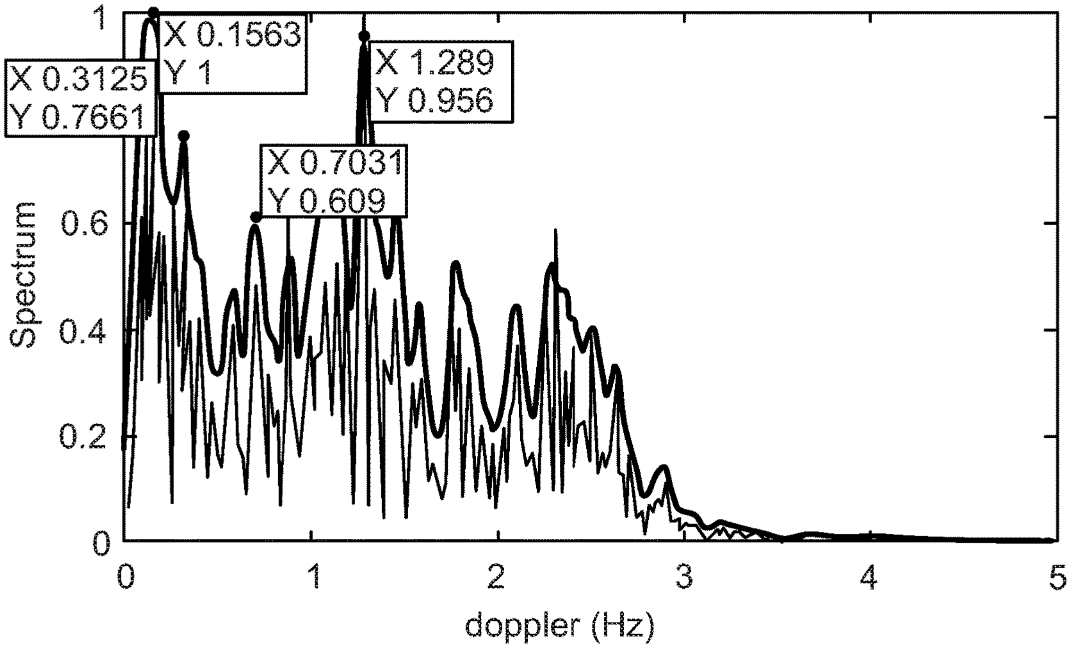
FIG. 15 shows a spectrum of a human target during minor movements.

For breathing coupled with other minor movements of a human target (e.g. a human target typing on a keyboard, moving his hand, etc.), the spectrum shows multiple frequency components that are in the breathing range. This is shown in FIG. 15, which depicts spectral contents for minor movements of a human target over doppler frequency. One option is to perform a time frequency analysis with the assumption that frequency components due to minor movements are discontinuous.

To find which of those frequency components to latch on to, the proposed method acquires a lock on the breathing frequency when the breathing is clean, then tracks that breathing frequency by picking a frequency peak that is closest to the locked frequency. If there is no frequency lock and multiple frequency components are found, the algorithm picks the lowest frequency peak, since that is likely the breathing frequency.

Figure 16:
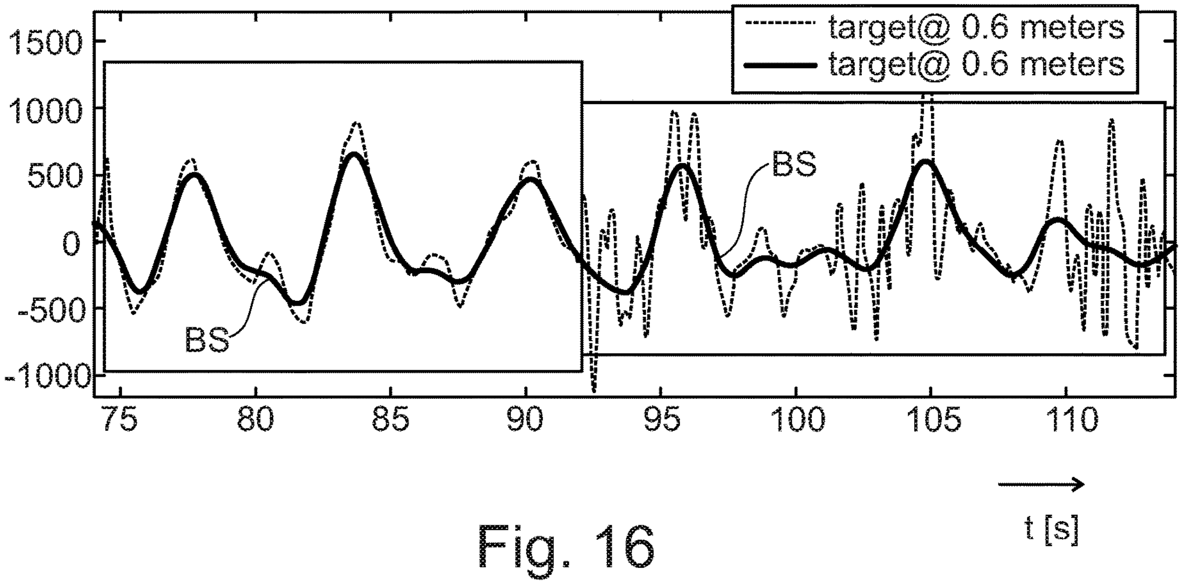
FIG. 16 shows a tracking breathing frequency during minor movements.

The time diagram of FIG. 16 shows in a left section a "clean breathing" (without minor movements) of a human target, wherein a dotted line represents a measuring signal and a solid line represents a breathing signal BS of the human target. In the right section of FIG. 16 additional minor movements of a breathing human target (e.g. human target drinks coffee) are considered. Nevertheless, also in this case the breathing signal BS corresponds essentially to that of the left section of FIG. 16.

Figure 17:
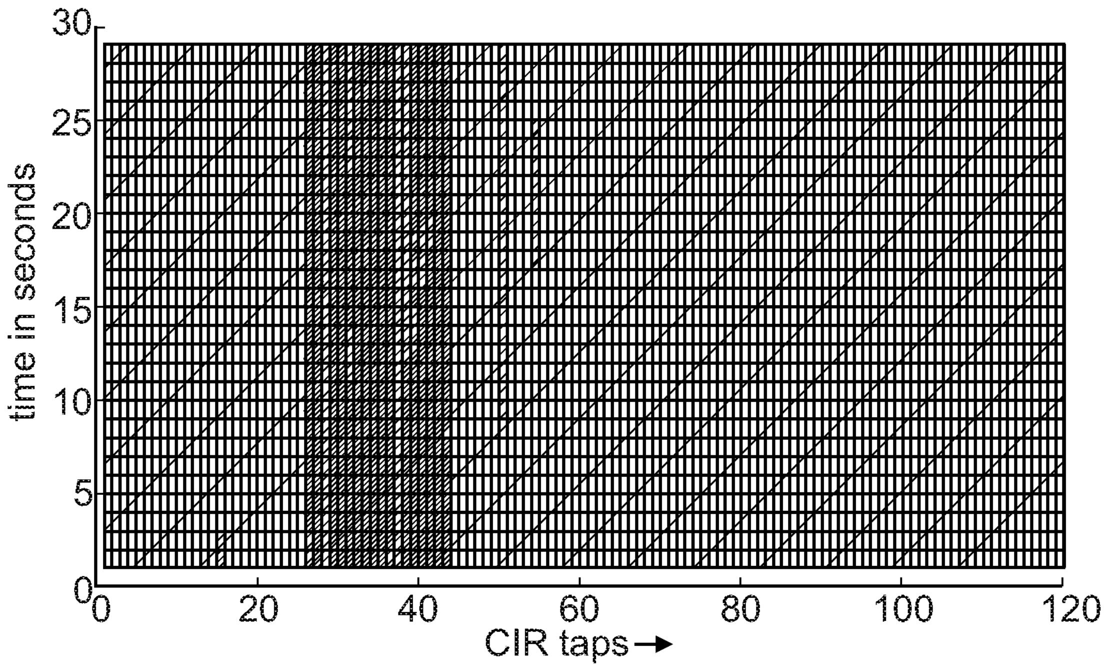
FIGS. 17 to 20 show results for two persons breathing with a capability of an algorithm of resolving two peaks by getting rid of tail peaks.
Figure 18:
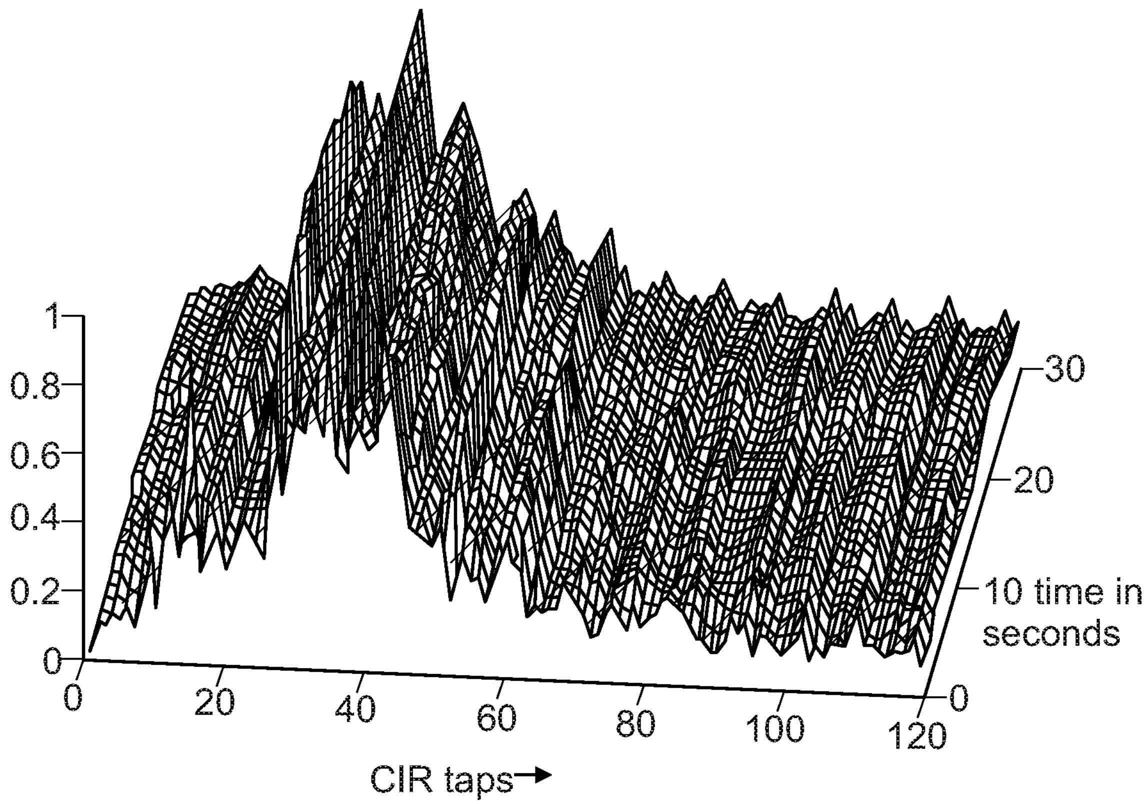

FIGS. 17 and 18 show diagrams with average CIRs of two human targets T1, T2 without an application of the proposed method. One recognizes, that the two human targets T1, T2 cannot be resolved unambiguously, rather there are present a lot of tail peaks.

Figure 19:
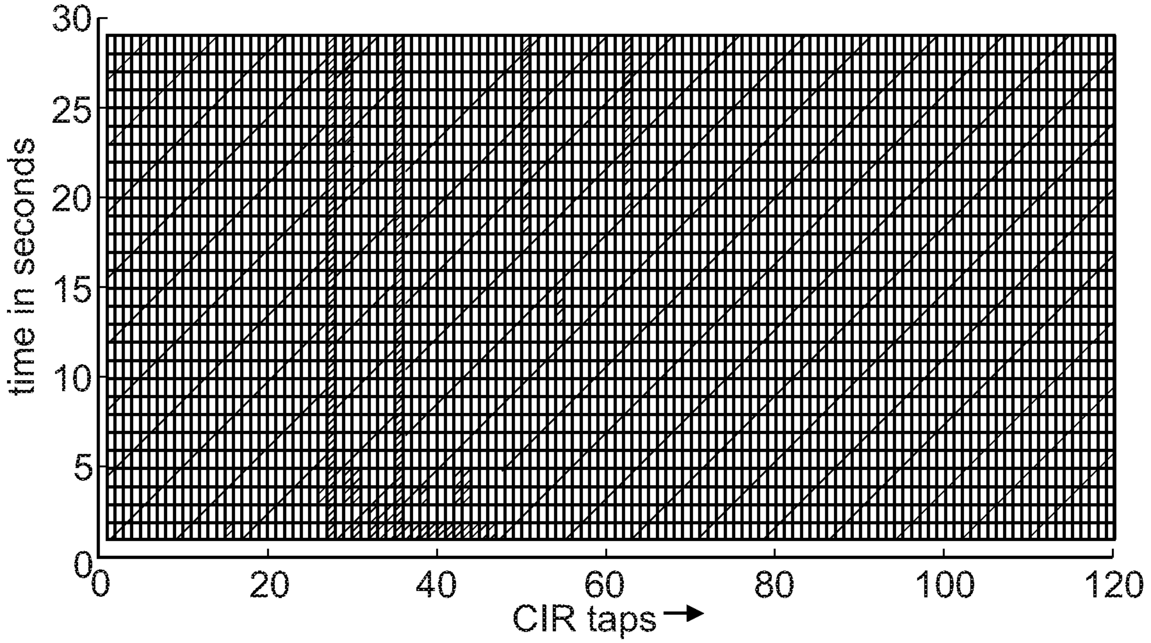
Figure 20:
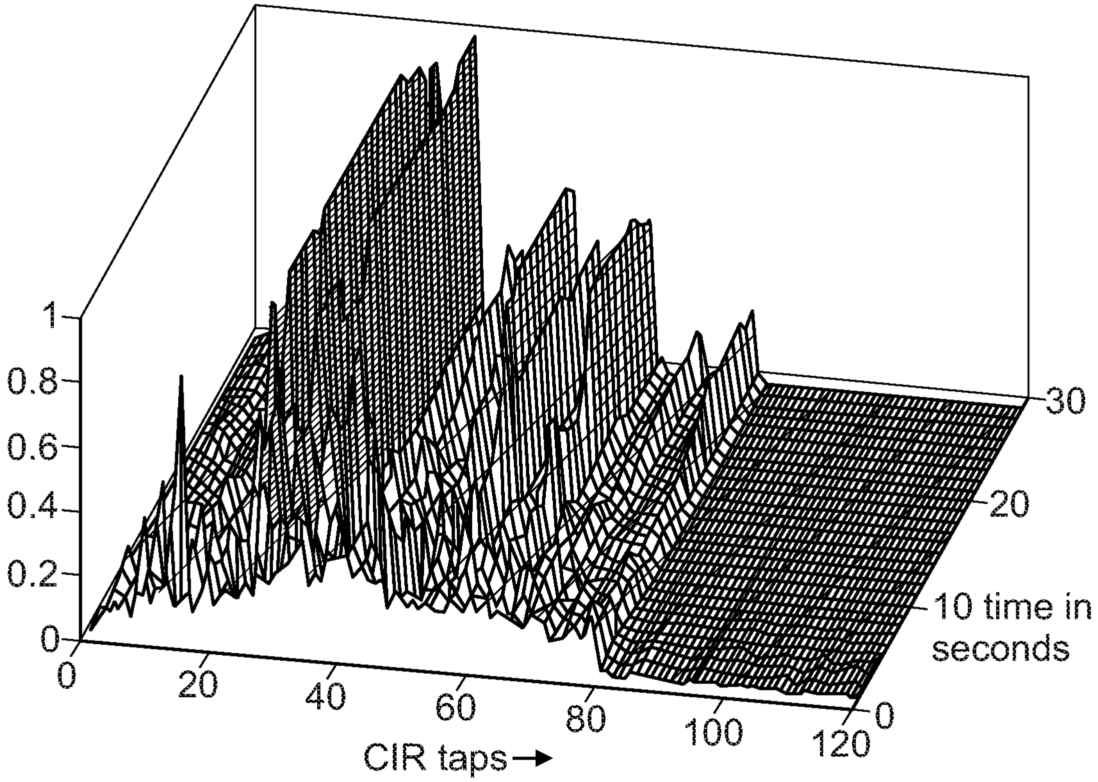

In contrast thereto, FIGS. 19 and 20 show that the proposed method with an implementation of adaptive reinforcement filtering and peak scaling as described above is capable of getting rid of tail peaks. The figures show two unambiguous and clear peaks (appr. at taps 28 and 36) of two human targets T1, T2. Advantageously, this results in an improved detection of the two human targets T1, T2.

Figure 21:
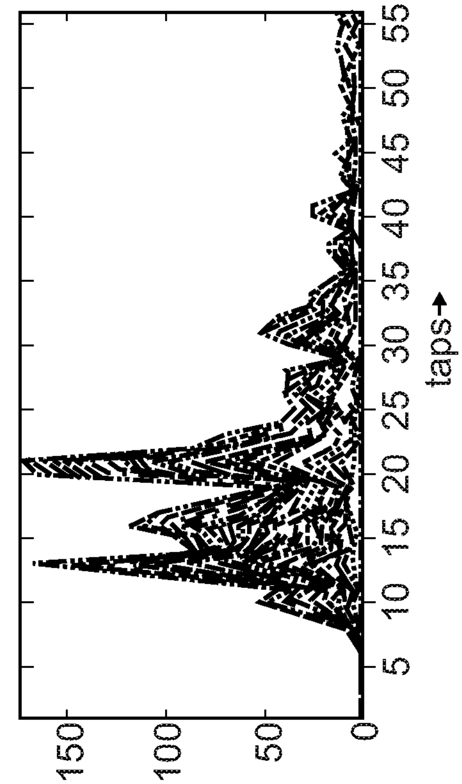
FIGS. 21 to 24 show results of the proposed method for two persons breathing detections.
Figure 22:
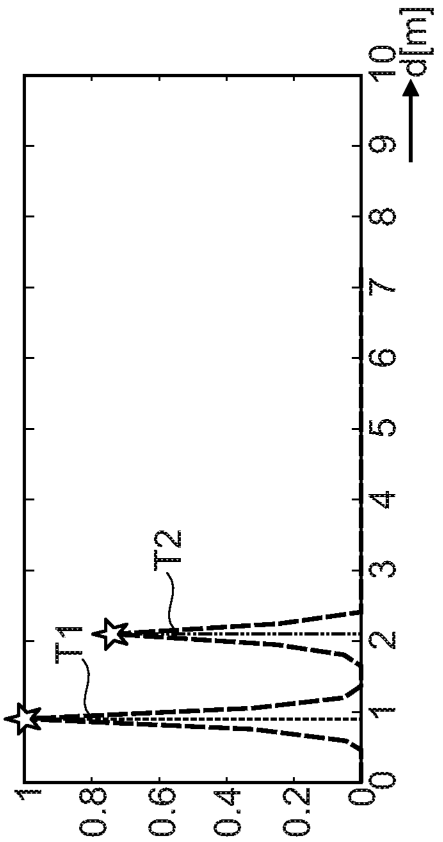
Figure 23:
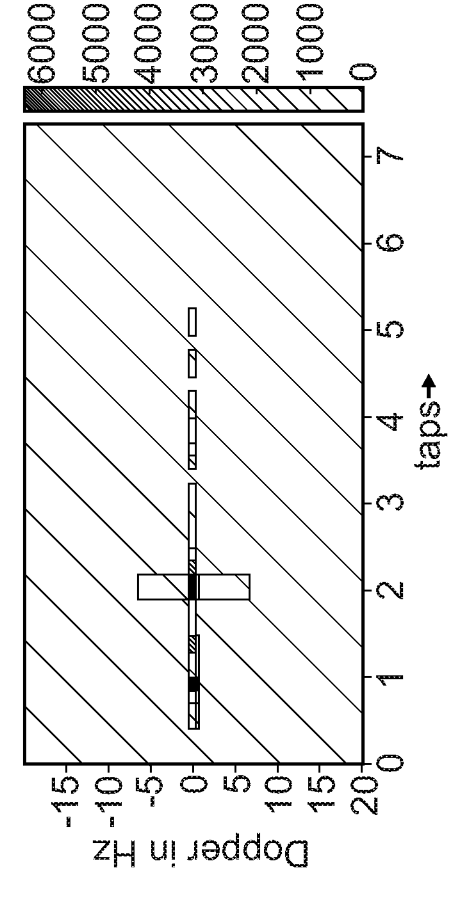
Figure 24:
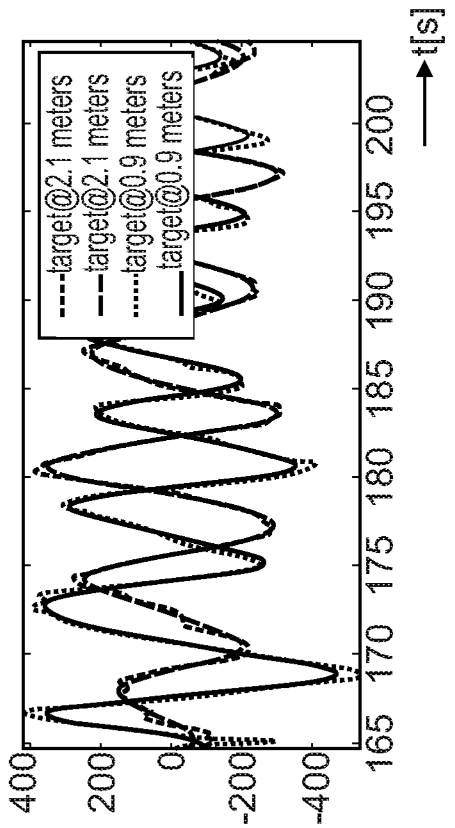

FIGS. 21 to 24 show target locations, breathing rates and breathing patterns being extracted by the UWB communication unit (UWB radar device) on two human targets T1, T2. FIG. 21 shows CIR after clutter removal as having been explained in the context of FIGS. 7 and 8. FIG. 22 shows breathing distances and breathing rates of two human targets T1, T2. FIG. 23 shows a doppler map with raw data of CIRs with respect to the two human targets T1, T2. The time diagram of FIG. 24 shows breathing patterns of the two human targets T1, T2.

Figure 25:
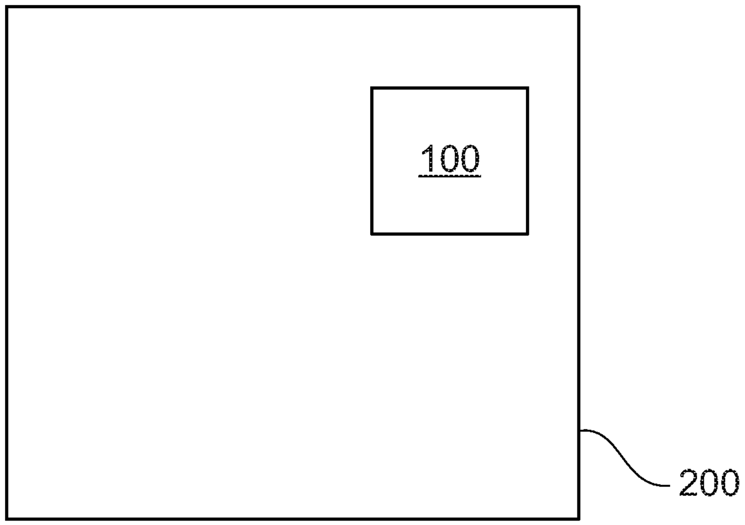
FIG. 25 shows a block diagram of an electronic communication device using a proposed UWB communication unit.

FIG. 25 shows a block diagram of a UWB communication unit 100, which represents a device of an electronic device 200 (e.g. smartphone, tablet, etc.) which is able to carry out the proposed method. The electronic device 200 can be used e.g. for a detection of breathing and heart rate of human targets, i.e. for human presence detection. If sudden changes of targets are detected, this circumstance can be signaled. If CIRs are detected closer to a coupled path, proximity of human targets can be signaled. If CIR peaks are detected that are moving closer, a collision warning can be given. The signaling can be done in at least one of the following ways: acoustically, optically, haptically, etc. Also a detection of gestures of human targets can be implemented on top of the algorithms outlined in this proposed method.

Figure 26A:
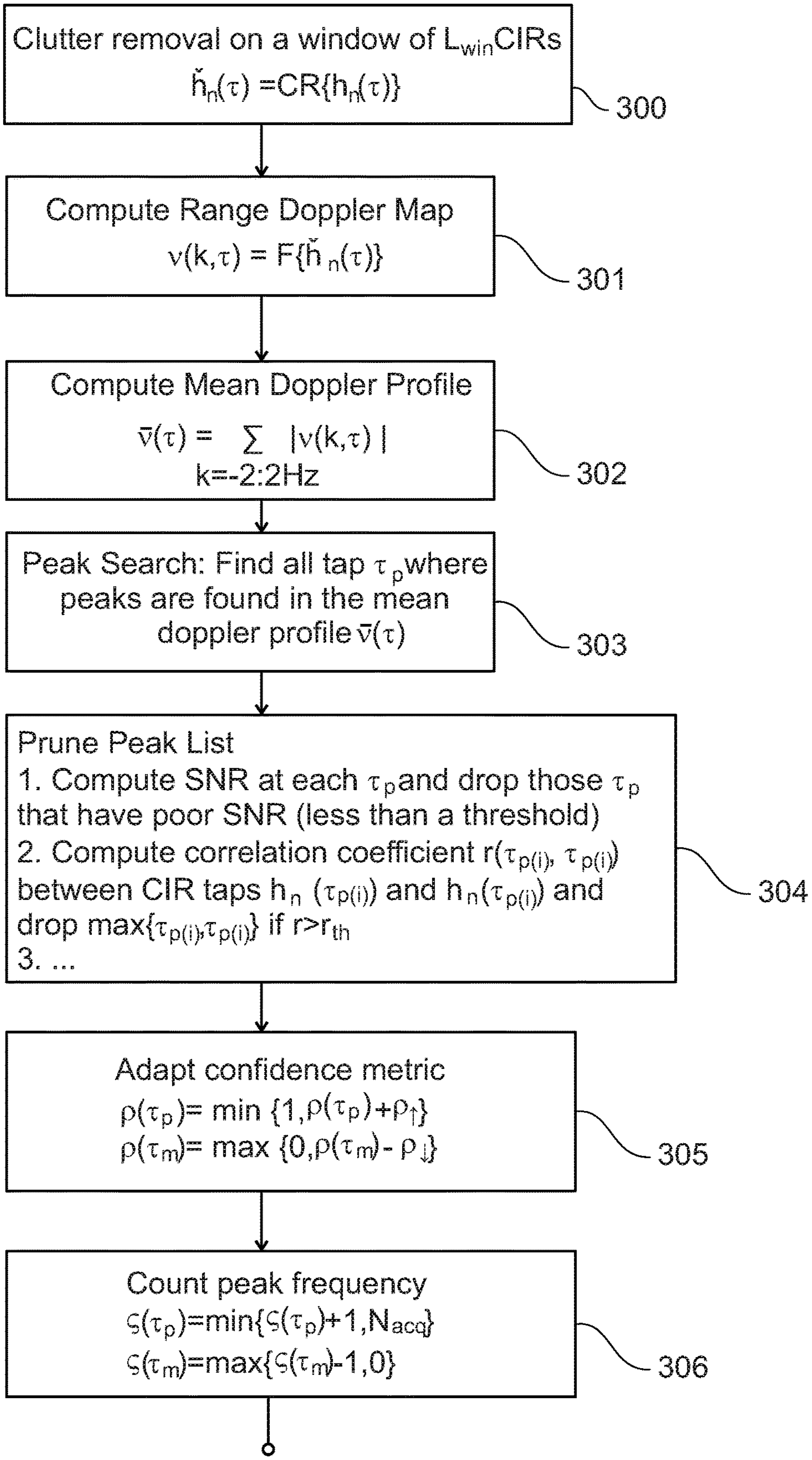
FIGS. 26A and 26B show a flow diagram of the proposed method.
Figure 26B:
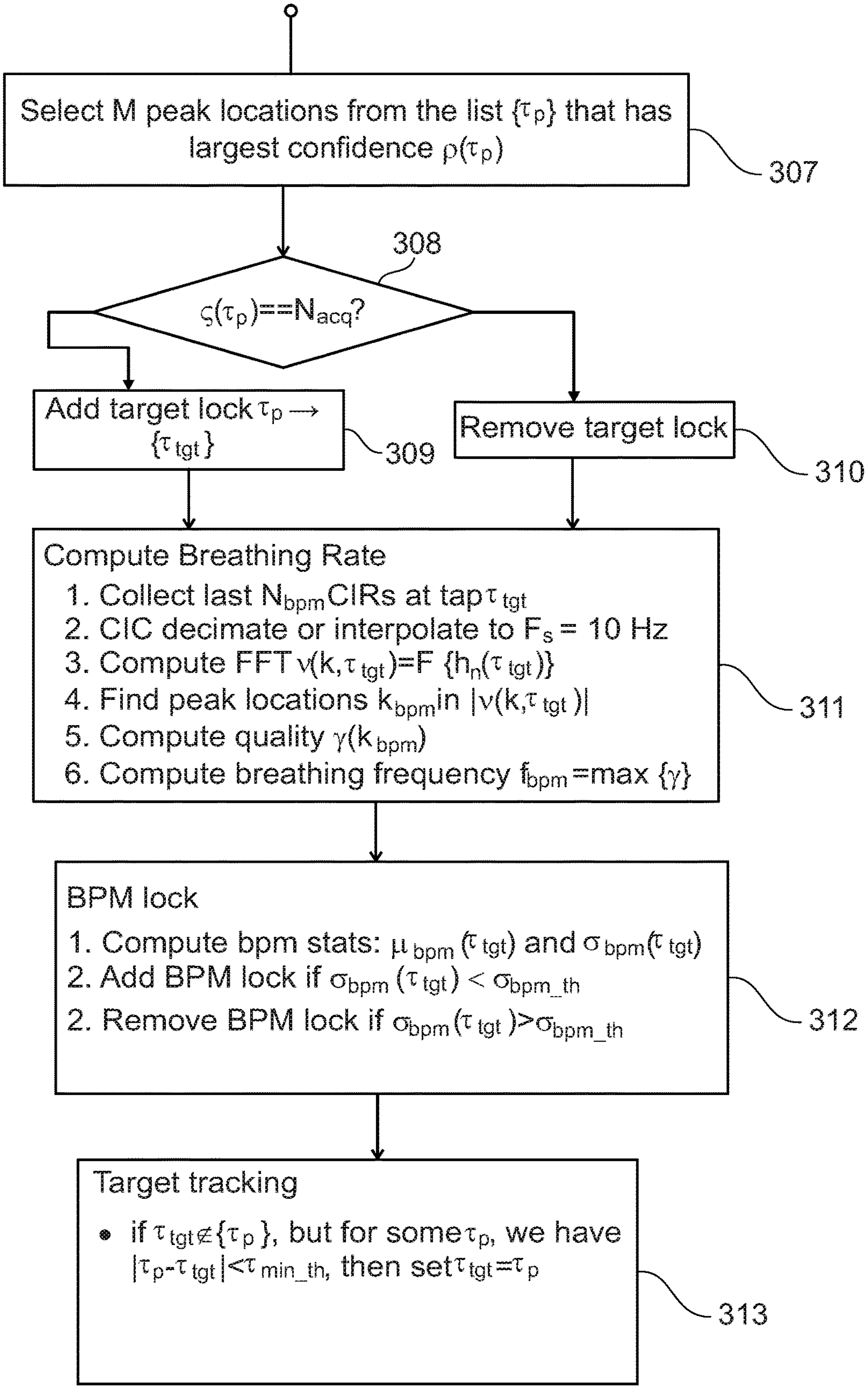

FIGS. 26A and 26B show an algorithm flow of the proposed method. The proposed algorithm can be summarized as follows:

Perform a leakage cancellation in step 300, wherein a coupling/clutter removal is performed.

Collect $N_{FFT}$ CIRs at $F_s$ Hz (RFRI=1/$F_s$). Max. doppler is $F_s/2$ Hz and doppler resolution is $F_s/N_{FFT}$.

Compute doppler matrix ($N_{FFT}\times N_{taps}$) in step 301 and compute a one dimensional mean doppler profile from the two dimensional doppler matrix in step 302.

Find all the peaks in the doppler matrix in step 303 with a 1D peak search based on the mean doppler magnitude across doppler bins of interest.

Prune peaks of a peak list in step 304 using one or more of the following pruning strategies: low SNR pruning, correlation based pruning, pathloss profile pruning, common peaks with mean CIR.

Adaptively reinforce the confidence values on the selected peaks in steps 305, 306. The proposed method aims to detect stable peaks and adaptively updates a confidence metric across multiple windows which converges in stable peaks.

In step 307 M peaks are selected, that have the best confidence metric (largest confidence values).

In step 308 a query is performed, whether a peak has been existent for a specified duration. In other words, it is checked, whether selected peaks are seen in last $N_{acq}$ windows.

Acquire target lock on selected peaks in step 309, otherwise the target lock is removed in step 310, depending on the result of the query of step 308.

Drop a locked peak from the tracking list only if it is not seen in last $N_{drop}$ windows in step 310.

The following computations are done in step 311: Compute the bpm (breathing per minute) mean and standard deviation for the locked targets. Furthermore, a breathing and a heart rate on target locked peaks are computed. Buffer $N_{bpm}$ samples of the CIR tap across slow time, wherein a BPM resolution is $$\frac{F_s}{2N_{bpm}}.$$

Compute FFT and find the frequency between 0.15 and 1 Hz that has max. magnitude or max prominence. Compute a quality metric for this peak.

Lock target bpm if the standard deviation is less than a specified threshold in step 312.

If the quality is lower than a threshold, pick a peak that is closest to the locked target bpm frequency.

Perform a target tracking of human targets in step 313.

Figure 27:
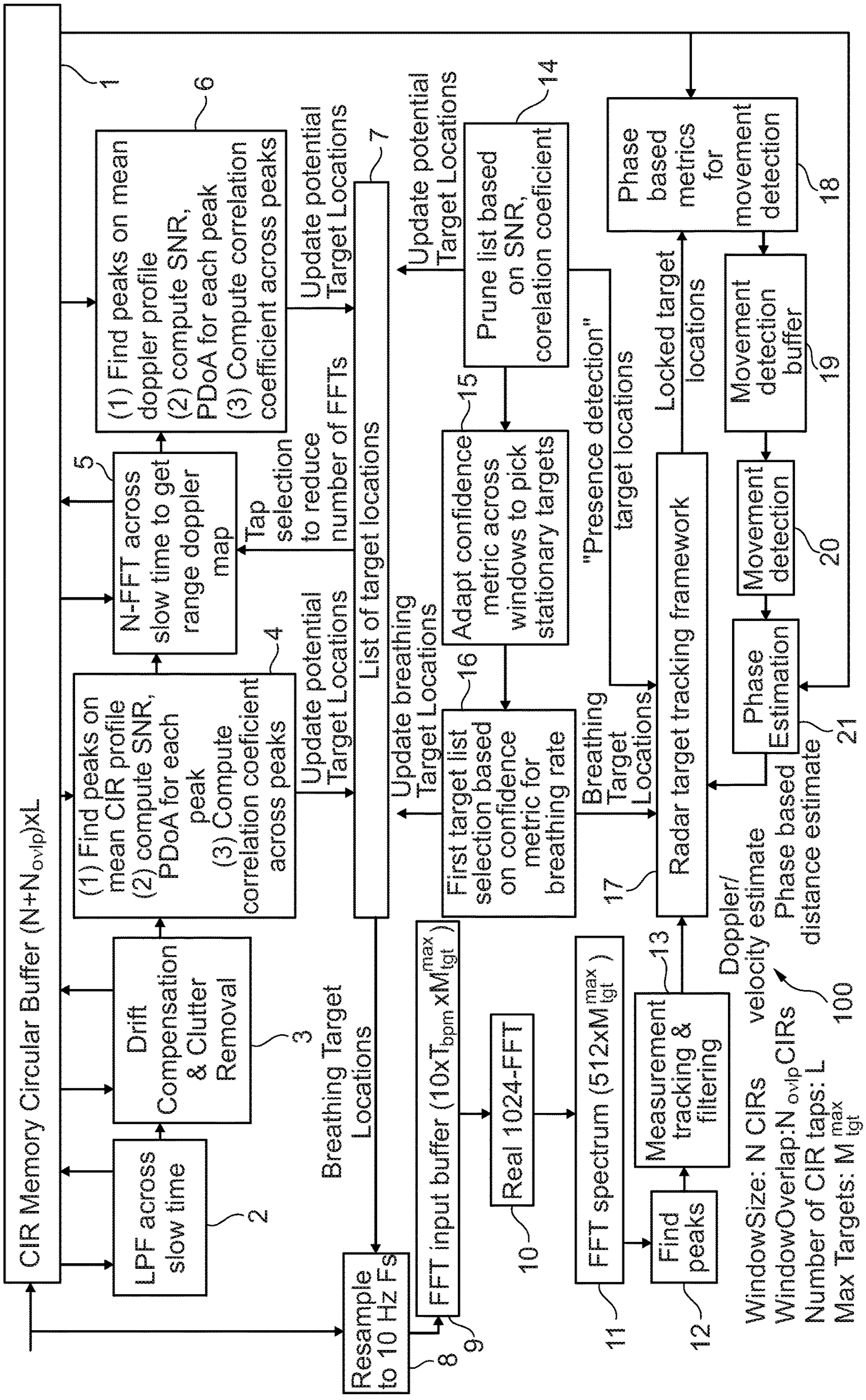
FIG. 27 shows an exemplary implementation of the algorithm on-chip.

FIG. 27 shows an exemplary possibility to implement the proposed method electronically on-chip, e.g. into a UWB communication unit 100. In essence, the implementation on-chip depicted in FIG. 27 corresponds to the method steps 300 to 313 of the flow diagram of FIGS. 26A and 26B, which have been explained in detail above. Therefore, the elements 1 to 21 of the UWB communication unit 100 are not explained in more detail hereinafter. The processing being carried out by the proposed method can be classified into two parts: processing within each window (per window processing) and processing across multiple windows.

Per Window Processing:

- Lowpass filter CIRs across slow time to limit to max doppler that can be estimated for a given RFRI
- Compensate for drift and do clutter removal
- Generate the range-doppler map
- find the targets via peak detection/CFAR, compute SNR, PDoA etc. for each target, compute the correlation coefficient across targets
- Select a list of targets that meet required criteria Moreover a processing can be done across windows (specific to breathing detection):

Adapt confidence metric for those targets

Find the targets whose confidence metrics are above a threshold

A breathing detection can be done in the following steps:

Buffer the CIR tap values for the selected target taps for a 10 second window

Resample to 10 Hz, compute FFT and find the strongest frequency component in the breathing frequency range Furthermore, target locations and breathing rates can be sent to a higher layer for further filtering and tracking.

For an efficient mapping of the proposed method to firmware or hardware, a careful utilization of electronic memories 1, 9, 11 and 19 should be considered for the processing. For example, a Matlab™ or host implementation can, for each window, store the raw CIRs, clutter removed CIRs, and the range doppler map, that is approximately three times the memory required for storing CIRs.

Breathing rate estimation requires the raw CIR target tap to be buffered for ten to twenty seconds. If there is no memory constraint, the raw CIR for all taps can be stored for second second duration, but this is impractical to do in a firmware or hardware implementation. Several other intermediate buffers that are used needs to be managed carefully as well. To map method to DSP or hardware:

The CIR storage problem should be efficiently addressed

Buffers should be managed and memory reused where possible

Computations can be reduced by incrementally refining the list of taps that are of interest The proposed method can be implemented at least partially as a software, which can be stored in a computer readable memory or at least partially as a firmware or at least partially as a hardware (e.g. UWB communication unit 100). The chip does mainly the distance measurements (Time-of-Flight measurements), wherein a host configures details which of the diverse UWB sessions should act as the primary session.

Hereinbefore, spatially relative terms, such as “front” and “back”, “above” and “below”, “left” and “right”, et cetera are used to describe an element’s relationship to another element(s) as illustrated in the figures. Thus, the spatially relative terms may apply to orientations in use which differ from the orientation depicted in the figures. Obviously all such spatially relative terms refer to the orientation shown in the figures only for ease of de-scription and are not necessarily limiting as an apparatus according to an embodiment can assume orientations different than those illustrated in the figures when in use.

Additionally unless expressly stated to the contrary, the terms “first”, “second”, “third”, etc. are intended to distinguish the particular nouns that modify (e.g. session, device, element, unit, condition, node, module, activity, session, step, operation, etc.). Unless expressly stated to the contrary, the use of these terms is not intended to indicate any type of order, rank, importance, temporal sequence, or hierarchy of the modified noun. For example, “first X” and “second X” are intended to designate two “X” elements that are not necessarily limited by any order, rank, importance, temporal sequence, or hierarchy of the two elements. Furthermore, as referred to herein, “at least one of” and “one or more of” can be represented using the “(s)” nomenclature (e.g. one or more element(s)).

Moreover, it should be noted that the term “comprising” does not exclude other elements or steps and “a” or “an” does not exclude a plurality. Also elements described in association with different embodiments may be combined. It should also be noted that reference signs in the claims should not be construed as limiting the scope of the claims. The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer readable medium, which may include storage devices and signals, in compressed or uncompressed form.

As used herein, the term “computer” refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term “computer” will mean either a processor in particular or more generally a processor in association with an assemblage of interrelated elements contained within a single case or housing.

The term “processor” or “processing unit” refers to a data processing circuit that may be a microprocessor, a co-processor, a microcontroller, a microcomputer, a central processing unit, a field programmable gate array (FPGA), a programmable logic circuit, or any circuit that manipulates signals (analog or digital) based on operational instructions that are stored in a memory. The term “memory” refers to a storage circuit or multiple storage circuits such as read-only memory, random access memory, volatile memory, non-volatile memory, static memory, dynamic memory, Flash memory, cache memory, or any circuit that stores digital information.

As used herein, a “computer-readable medium” or “storage medium” may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random-access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document. Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

It has to be noted that embodiments have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this application.

REFERENCE NUMERALS

1 . . . 21 elements of UWB communication unit
100 UWB communication unit
200 electronic device
300 . . . 313 method steps
d distance
BS breathing signal
bpm breathing per minute
UWB Ultra Wide Band
CIR Channel Impulse Response
LRP Low Rate Pulse
HRP High Rate Pulse
PRF Pulse Repetition Frequency
BPRF Base PRF
HPRF High PRF
LPRF Low PRF
RFRI Radar Frame Repetition Interval
T1, T2 human targets
ToA Time of Arrival
ToF Time of Flight

What is claimed is:

1. A method for operating an ultra-wideband (UWB) communication unit, the method comprising:
- repeatedly transmitting a UWB signal and receiving channel-impulse-responses (CIRs);
- removing data concerning a coupling path between transmit (TX) and receive (RX) paths from the CIRs and performing a drift compensation of the data concerning the coupling path to produce compensated CIRs;
- detecting target peaks within the compensated CIRs;
- pruning of peaks in a peak list with target peaks within the compensated CIRs by:
  - computing a signal-to-noise ratio (SNR) for each determined peak; and
  - removing identified peaks within the peak list that have a specified SNR;
- assigning a confidence value to selected peaks of the filtered CIRs and adapting the confidence value of the selected peaks; and
- in response to assigning and adapting the confidence value, extracting at least one peak concerning a human target out of the list of peaks which has a specified confidence value.

2. The method according to claim 1, wherein determining the data is performed in time domain.

3. The method according to claim 1, wherein determining the data includes removing static targets in time domain by subtracting one a reference from the CIRs to produce clutter-removed CIRs to perform the drift compensation on the clutter-removed CIRs.

4. The method according to claim 3, wherein:
- repeatedly transmitting a UWB signal and receiving CIRs comprises:
  - receiving a set of multiple CIRs for each transmission of a UWB signal, wherein:
    - a plurality of sets of multiple CIRs are received;
    - each set of multiple CIRs includes a first CIR;
    - every first CIR is taken as a reference and is subtracted from every following next defined number of the CIRs of the set of multiple CIRs.

5. The method according to claim 3, wherein the detecting of the target peaks comprises:
- computing a range doppler map out of clutter-removed CIRs and a mean doppler profile;
- wherein the clutter-removed CIRs are averaged within one window.

6. The method according to claim 5, wherein the detecting of the target peaks comprises detecting the target peaks by using a radio frequency (RF) filter with specific equalizer coefficients.

7. The method according to claim 5, wherein in step d) the pruning of the peaks in the peak list further comprises:
- Computing a correlation coefficient between each peak and subsequent peaks; and removing the subsequent peaks if their correlation coefficient is above a specified threshold.

8. The method according to claim 5, wherein pruning of peaks in a peak list comprises removing data related to targets that are changing locations.

9. The method according to claim 8, wherein assigning a confidence value to selected peaks comprises assigning a confidence value to a target, where a peak with a converging specified confidence level is defined as a human target.

10. The method according to claim 9, wherein assigning a confidence value to selected peaks comprises;
- locking one or more peaks as the human targets based on the confidence values;
- wherein a final list of targets as targets is determined which consistently existed over a defined number of windows.

11. The method according to claim 10, wherein extracting at least one peak concerning a human target comprises determining a breathing pattern of a human target.

12. The method according to claim 1, wherein extracting the at least one peak concerning the human target comprises:
- determining a frequency component based on the at least one peak;
- attempting to lock onto a breathing frequency over time by determining the frequency component in at least one subsequent peak; and subsequently:

tracking the breathing frequency by selecting one or more subsequent peaks that are similar to the breathing frequency; and when the attempt to lock onto the breathing frequency fails and multiple frequency components are determined, selecting a lowest frequency of the multiple frequency components as the breathing frequency.

13. A non-transitory computer-readable storage medium storing executable instructions that, when executed, cause a processor to operate operating an ultra-wideband (UWB) communication unit, the method comprising:

repeatedly transmitting a UWB signal and receiving channel-impulse-responses (CIRs);

removing data concerning a coupling path between transmit (TX) and receive (RX) paths from the CIRs and performing a drift compensation of the data concerning the coupling path to produce compensated CIRs;

detecting target peaks within the compensated CIRs;

pruning of peaks in a peak list with target peaks within the compensated CIRs by:

determining a signal-to-noise ratio (SNR) for each determined peak; and removing identified peaks within the peak list that have a specified SNR;

assigning a confidence value to selected peaks of the filtered CIRs and adapting the confidence value of the selected peaks; and in response to assigning and adapting the confidence value, extracting at least one peak concerning a human target out of the list of peaks which has a specified confidence value.

14. The non-transitory computer-readable storage medium of claim 13, wherein the executable instruction that cause the processor to determine the data comprises instructions that cause the processor to perform the method including removing static targets in time domain by subtracting a reference from the CIRs to produce clutter-removed CIRs to perform the drift compensation on the clutter-removed CIRs.

15. The non-transitory computer-readable storage medium of claim 13, wherein the executable instructions that cause the processor to repeatedly transmit a UWB signal and receive CIRs include instructions that cause the processor to perform the method comprising:

receiving a set of multiple CIRs for each transmission of a UWB signal, wherein:

a plurality of sets of multiple CIRs are received;

each set of multiple CIRs includes a first CIR;

every first CIR is taken as a reference and is subtracted from every following next defined number of the CIRs of the set of multiple CIRs.

16. The non-transitory computer-readable storage medium of claim 13, wherein the executable instructions that cause the processor to determine the data comprises instructions that cause the processor to perform the method including:

computing a range doppler map out of clutter-removed CIRs and a mean doppler profile;

wherein the clutter-removed CIRs are averaged within one window.

17. The non-transitory computer-readable storage medium of claim 13, wherein the executable instructions that cause the processor to detect the target peaks comprises instructions that cause the processor to perform the method including using a radio frequency (RF) filter with specific equalizer coefficients to detect the peaks.

18. The non-transitory computer-readable storage medium of claim 13, wherein the executable instructions that cause the processor to prune the peaks in the peak list comprises instructions that cause the processor to perform the method including:

determining a correlation coefficient between each peak and subsequent peaks; and removing the subsequent peaks if their correlation coefficient is above a specified threshold.

19. The non-transitory computer-readable storage medium of claim 13, wherein the executable instructions that cause the processor to prune the peaks in the peak list comprises instructions that cause the processor to perform the method including removing data related to targets that are changing locations.

20. The non-transitory computer-readable storage medium of claim 19, wherein the executable instructions that cause the processor to assign the confidence value to the selected peaks comprises instructions that cause the processor to perform the method including:

assigning the confidence value to a target, where a peak with a converging specified confidence level is defined as a human target;

locking one or more peaks as the human targets based on the confidence values, wherein a final list of targets as targets is determined which consistently existed over a defined number of windows;

determining a breathing pattern of a human target; and wherein extracting the least one peak comprises:

determining a frequency component based on the at least one peak;

attempting to lock onto a breathing frequency over time by determining the frequency component in at least one subsequent peak; and subsequently:

tracking the breathing frequency by selecting one or more subsequent peaks that are similar to the breathing frequency; and when the attempt to lock onto the breathing frequency fails and multiple frequency components are determined, selecting a lowest frequency of the multiple frequency components as the breathing frequency.

* * * * *